(12) United States Patent
McCarthy et al.

(10) Patent No.: US 8,013,792 B2
(45) Date of Patent: Sep. 6, 2011

(54) METHOD AND APPARATUS TO MINIMIZE ANTENNA BACKSIDE SIGNAL RESPONSE AND AMBIGUITY

(75) Inventors: Daniel McCarthy, Manlius, NY (US);
Dean Paschen, Lafayette, CO (US);
Lary Eichel, Louisville, CO (US);
Frank Pratt, Tipp City, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 175 days.

(21) Appl. No.: 12/462,632

(22) Filed: Aug. 6, 2009

(65) Prior Publication Data
US 2010/0066608 A1   Mar. 18, 2010

Related U.S. Application Data

(60) Provisional application No. 61/192,323, filed on Sep. 17, 2008.

(51) Int. Cl.
*H01Q 3/26* (2006.01)
*H01Q 3/00* (2006.01)

(52) U.S. Cl. ............... 342/375; 342/359; 342/383
(58) Field of Classification Search ............... 342/359, 342/375, 383
See application file for complete search history.

(56) References Cited

U.S. PATENT DOCUMENTS

| 4,298,873 A * | 11/1981 | Roberts ............... 342/375 |
| 5,363,111 A * | 11/1994 | Murphy ............... 342/383 |

* cited by examiner

*Primary Examiner* — Thomas Tarcza
*Assistant Examiner* — Cassie Galt
(74) *Attorney, Agent, or Firm* — Joseph A. Mancini

(57) ABSTRACT

Method and apparatus for minimizing antenna backside signal response and ambiguity in low frequency applications, particularly low frequency synthetic aperture radar (SAR). Various time delay elements are selectably switched into the signal path so as to cause a null to be placed in the antenna response pattern in the direction of undesired radar returns. The means for selectably switching may be dithered so as to introduce modulation onto the undesired radar return to aid in the discrimination and removal of the undesired radar return from the SAR image during post processing.

12 Claims, 7 Drawing Sheets

METHOD AND APPARATUS TO MINIMIZE ANTENNA BACKSIDE SIGNAL RESPONSE AND AMBIGUITY

PRIORITY CLAIM UNDER 35 U.S.C. §119(e)

This patent application claims the priority benefit of the filing date of provisional application Ser. No. 61/192,323, having been filed in the United States Patent and Trademark Office on Sep. 17, 2008 and now incorporated by reference herein.

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the field of radar. More specifically, the present invention relates to synthetic aperture radar (SAR).

The operation of SAR is a side-looking process. This is due to the fact that one axis of the imaging process is the radar range, and the imaging process effectively collapses in the range direction of the antenna aperture which is downward looking. Any response from energy in the downward direction is eliminated by range gating (i.e., the elimination of the signal by exclusion of certain time periods in the receive window). For many microwave SAR systems, the antenna pattern is directional enough that the combination of range gating and pattern amplitude is sufficient for good imaging.

Microwave SAR systems are, however, limited in their capability to identify targets through obstruction such as foliage. Therefore, one must look to lower frequency imaging systems for effective penetration. On the other hand, VHF SAR is useful because it is low enough in frequency to operate through foliage. But, as the frequency of operation drops to the VHF range, the size of the typical antenna is electrically too small to achieve a pattern that is very directional, therefore range gating no longer suffices to ensure good imaging.

The fundamental problem lies in the fact that electrically small apertures produce near omni directional beam patterns. Omni directional beam patterns cause a multitude of reflection back into the radar at the same ranges as the desired target. These are impossible to eliminate by range gating because they will pass through the same range gate as the intended target image. What is lacking in the prior art is either a method or apparatus which can provide good SAR imaging at lower (i.e., VHF) frequencies.

OBJECTS AND SUMMARY OF THE INVENTION

The present invention provides a method and apparatus to minimize antenna backside signal response and ambiguity.

The present invention therefore results in a method and apparatus to minimize antenna response to received signals originating from undesired directions.

It is therefore an object of the present invention to provide a method and apparatus to eliminate the ambiguity that received signals originating from undesired directions cause.

It is a further object of the present invention to provide a method and apparatus to introduce response nulls anywhere into an antenna response pattern.

It is yet still a further object of the present invention to provide a method and apparatus to detect and discriminate received signals originating from undesired directions.

An additional object of the present invention is to provide a method and apparatus to process a SAR image in a manner that reduces the effect of received signals originating from undesired directions thereon.

Briefly stated, the present invention provides a method and apparatus for minimizing antenna backside signal response and ambiguity in low frequency applications, particularly low frequency synthetic aperture radar (SAR). Various time delay elements are selectably switched into the signal path so as to cause a null to be placed in the antenna response pattern in the direction of undesired radar returns. The means for selectably switching may be dithered to as to introduce modulation onto the undesired radar return to aid in the discrimination and removal of the undesired radar return from the SAR image during post processing.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

As described in the Background of the Invention, range gating cannot be used to eliminate energy from the same range in the backwards direction at low frequencies. This ambiguity can only be eliminated though spatial methods such as antenna pattern control. The present invention, therefore, provides a method and apparatus that creates a broadband null in the backwards direction of an antenna pattern at low frequencies.

Figure 1:
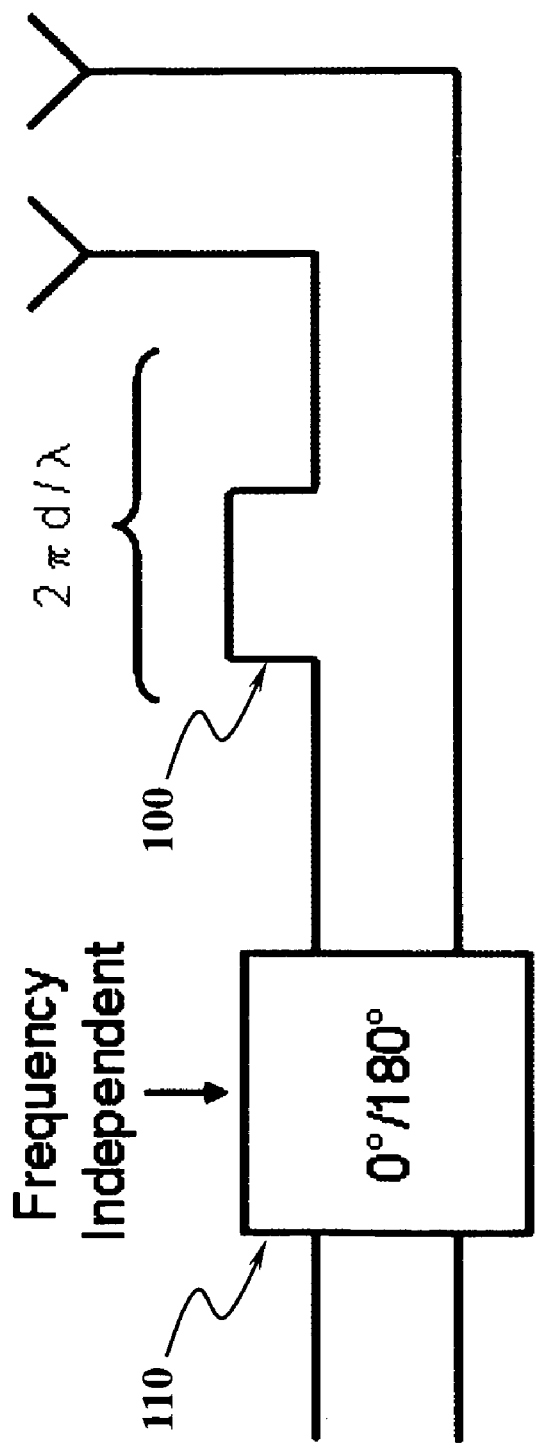
FIG. 1 is a schematic diagram of a prior art apparatus to position a null in the radiation pattern of an antenna using a broadband relative delay between elements.

FIG. 1, a depiction of the prior art, uses time delay 100 to set the angle of the null position and a broadband 180 degree hybrid 110 to force a null in the near-omni directional radiation pattern at that spatial position corresponding to that delay in time. The time delay 100 is governed by:

$$2\pi d/\lambda$$

where d is the length of the electrical delay and $\lambda$ is the wavelength corresponding to the frequency of operation.

Fundamentally, the prior art teaches how to place a null at a predetermined position in an antenna radiation pattern. But it does not teach what is necessary to effectively cancel false (ambiguous) imaging from a low frequency SAR. What is yet needed and is provided by the present invention is an apparatus and method for isolating ambiguous imaging from desired imaging notwithstanding the position of the forced null nor its width. Therefore, the preferred embodiment of the present invention employs switching between two or more time delay elements so as to cause two or more nulls placed in two or more positions. The present invention creates several slightly displaced nulls within respective antenna patterns and scans received energy over them. The invention then processes this energy and determines the differences between respective antenna patterns. From this, the present invention can determine energy from desired image scan angles from ambiguous energy entering the antenna from the same range but undesired angle.

Figure 2:
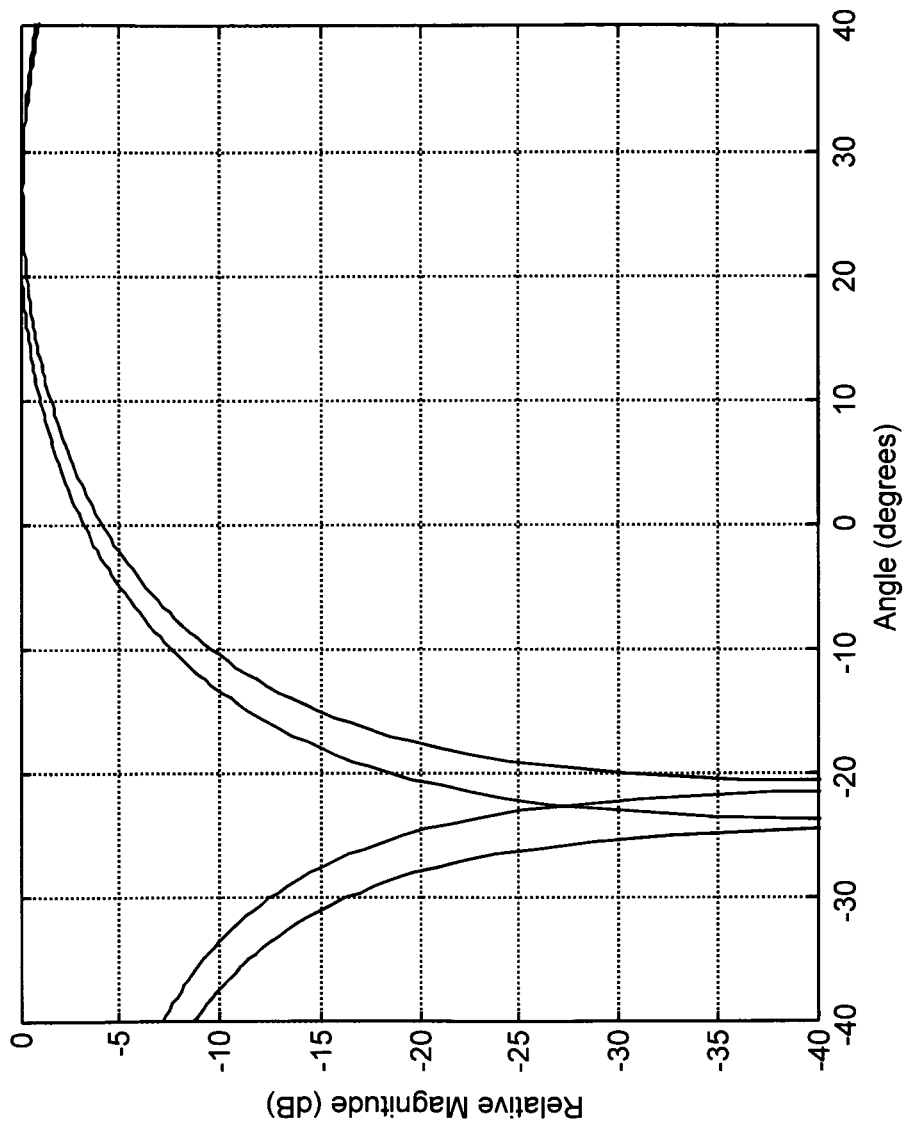
FIG. 2 is an antenna radiation pattern depicting the affect of each having a first null position changed.

FIG. 2 shows an antenna pattern for two different null positions. It should be noted that as a benefit of the present invention the amplitude response across the antenna main beam peak region is only slightly changed (i.e., fractional dB) by switching between the two null positions. However, in contrast, the same repositioning of the corresponding nulls indicates as much as a 10 dB difference in amplitude response at the same angle. It is the lack of amplitude difference in the main beam and the significant amplitude difference in the nulls that the present invention's post processing can use to discriminate energy from desired images from that of undesired (range ambiguous) images.

Figure 3:
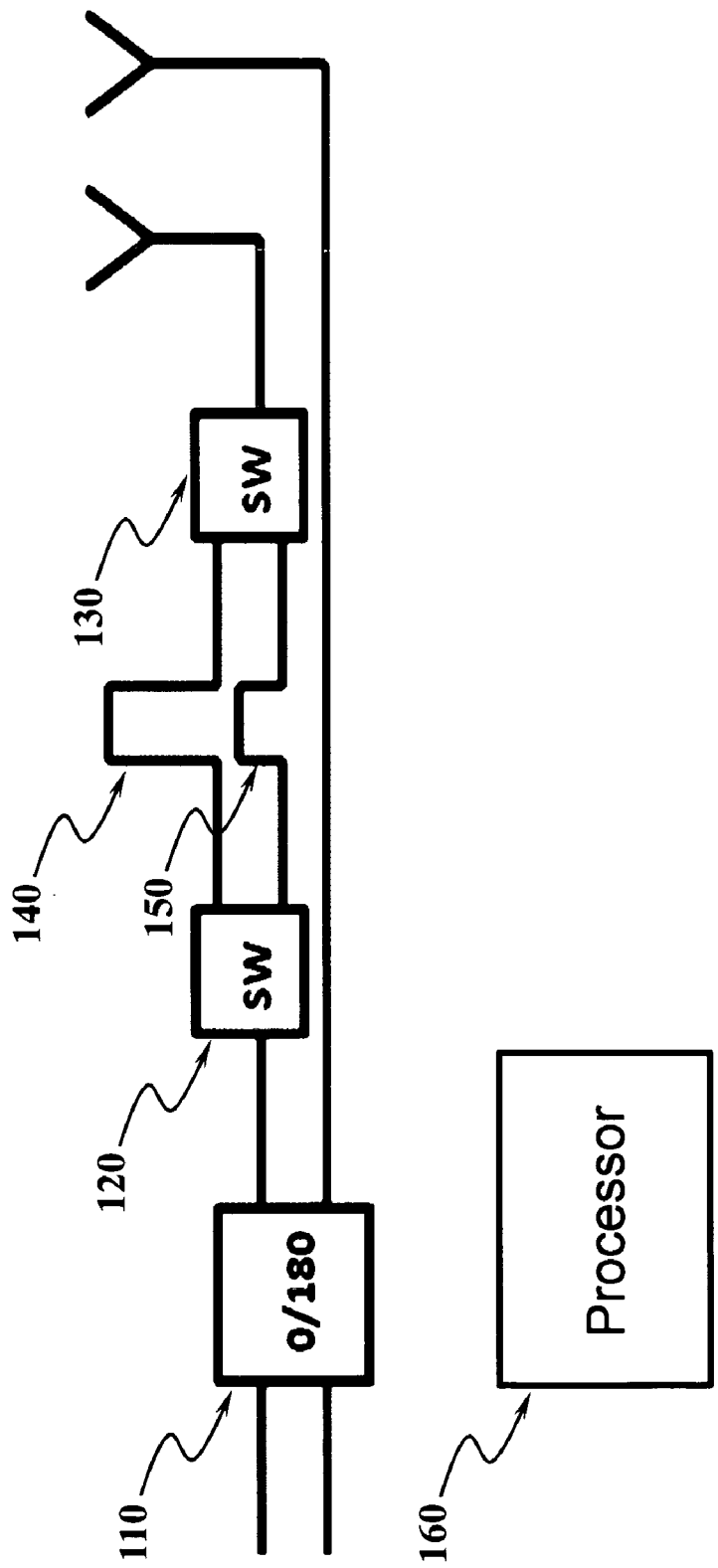
FIG. 3 is a schematic diagram of an apparatus to switch the position of a null in an antenna radiation pattern.

Referring to FIG. 3, the preferred embodiment of the present invention creates two null positions though the addition of a first switch 120 and a second switch 130 on either side of a first time delay 140 and a second time delay 150. Switching allows placement of the null in either of two different locations in the antenna beam pattern. While two discrete time delay elements are depicted, there is no limitation to the number of discrete nulls that can be created because there is no limitation to the number of time delays or switches that can be employed to switch time delays in or out of the path between the signal source and antenna radiating elements. Processor 160 runs a software program which controls the switching of first switch 120 and second switch 130. First time delay 140 and second time delay 150 may be discrete time delay elements such as coaxial or waveguide sections of transmission line. However, the invention is not limited to the incorporation of fixed time delay elements. Variable time delays may be employed where they are of sufficiently broad bandwidth. The invention may also forego switches where variable time delay is used.

Figure 4:
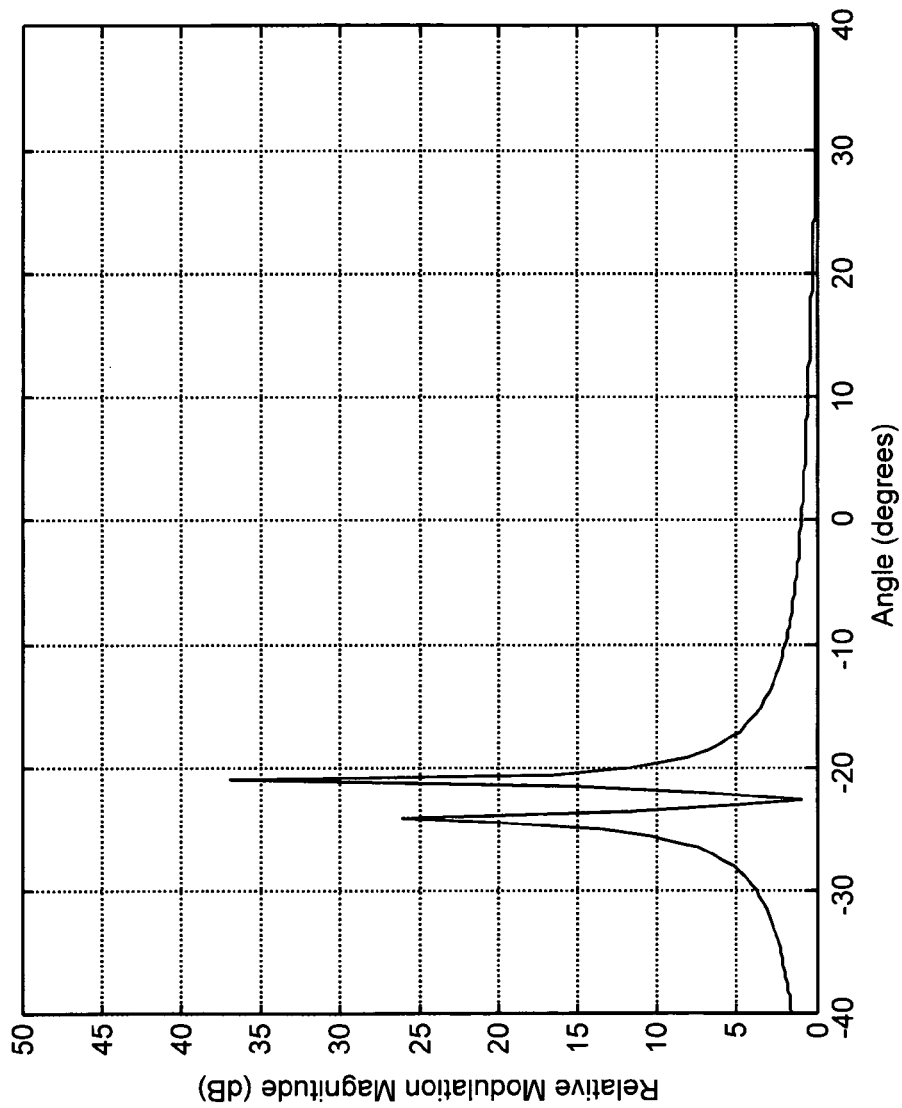
FIG. 4 depicts the lack of amplitude modulation affect on an antenna radiation pattern main beam, but significant relative amplitude modulation between two switched null positions.
Figure 5:
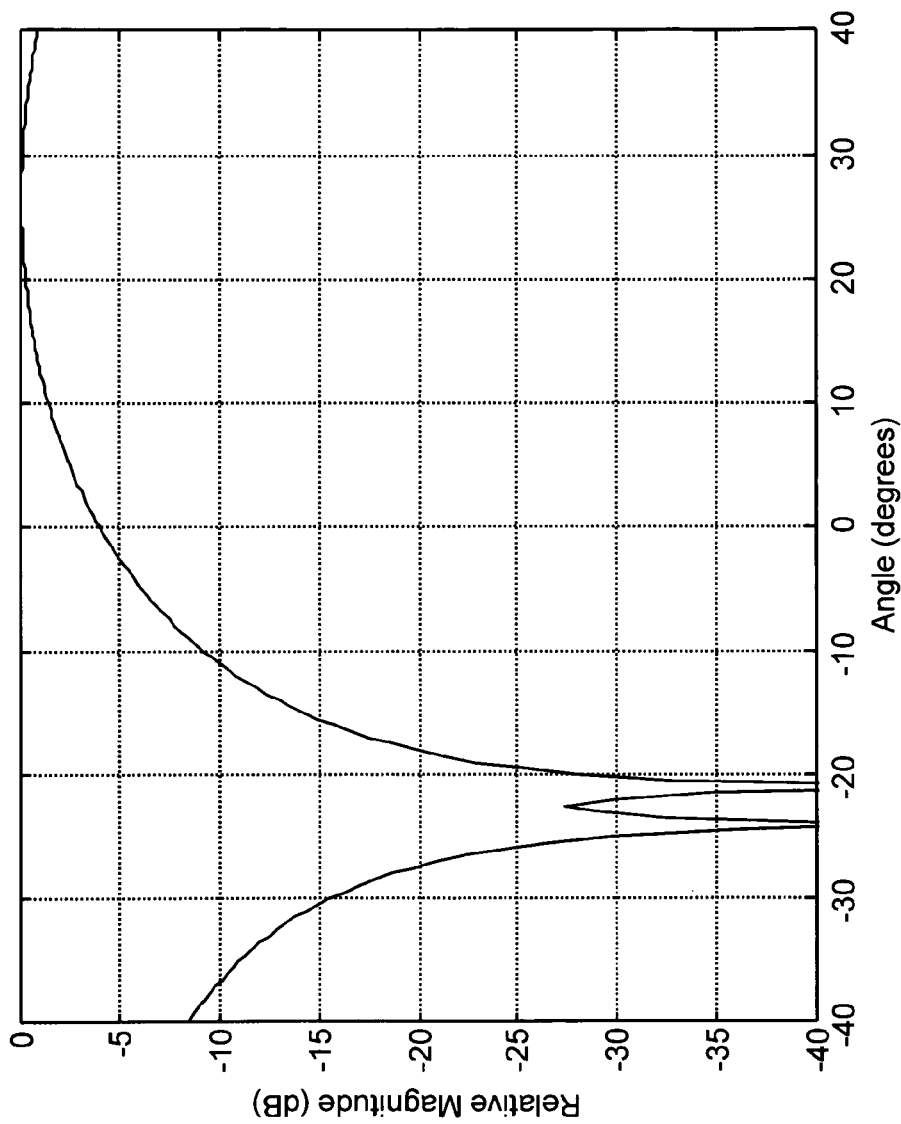
FIG. 5 depicts the width and depth of a null placed in an antenna radiation pattern relative to the main beam.

Referring to FIG. 4 shows that while the switching of the null position does induce some modulation on the antenna main beam, it is minimal. Nearly all (i.e., 80%) of switching-induced modulation on the main beam can be removed by processing as depicted in FIG. 5.

However, and still referring to FIG. 4 indicates that significant modulation occurs in the vicinity of the null position as the null is switched between two discrete positions. Herein lies the benefit of the present invention in discriminating energy from desired targets from energy from undesired ambiguous targets at the same range. The switching of the nulls produces a scintillation effect attributed to switching the null position. The modulation of the amplitude response caused by switching the null position (i.e., apparent scintillation) in the ambiguous targets is detected in a computer processor, which in turn, tags radar returns having this modulation as ambiguous. Whereas, desired radar returns will enter the main beam, will not exhibit these modulation effects, and will be tagged as desired returns.

Figure 6:
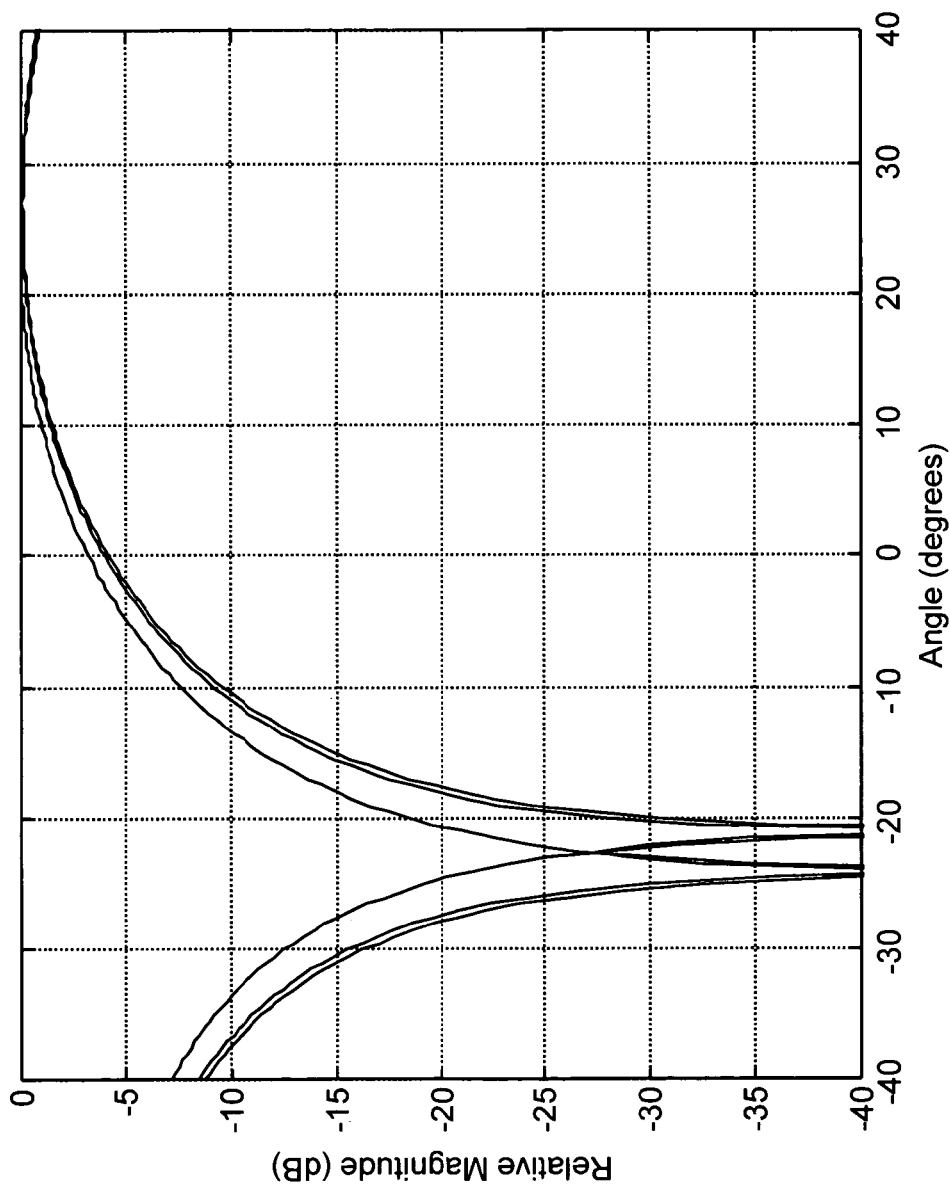
FIG. 6 depicts the minimal affects that switching the position of a null to one of three distinct positions in an antenna radiation pattern has upon the main beam.
Figure 7:
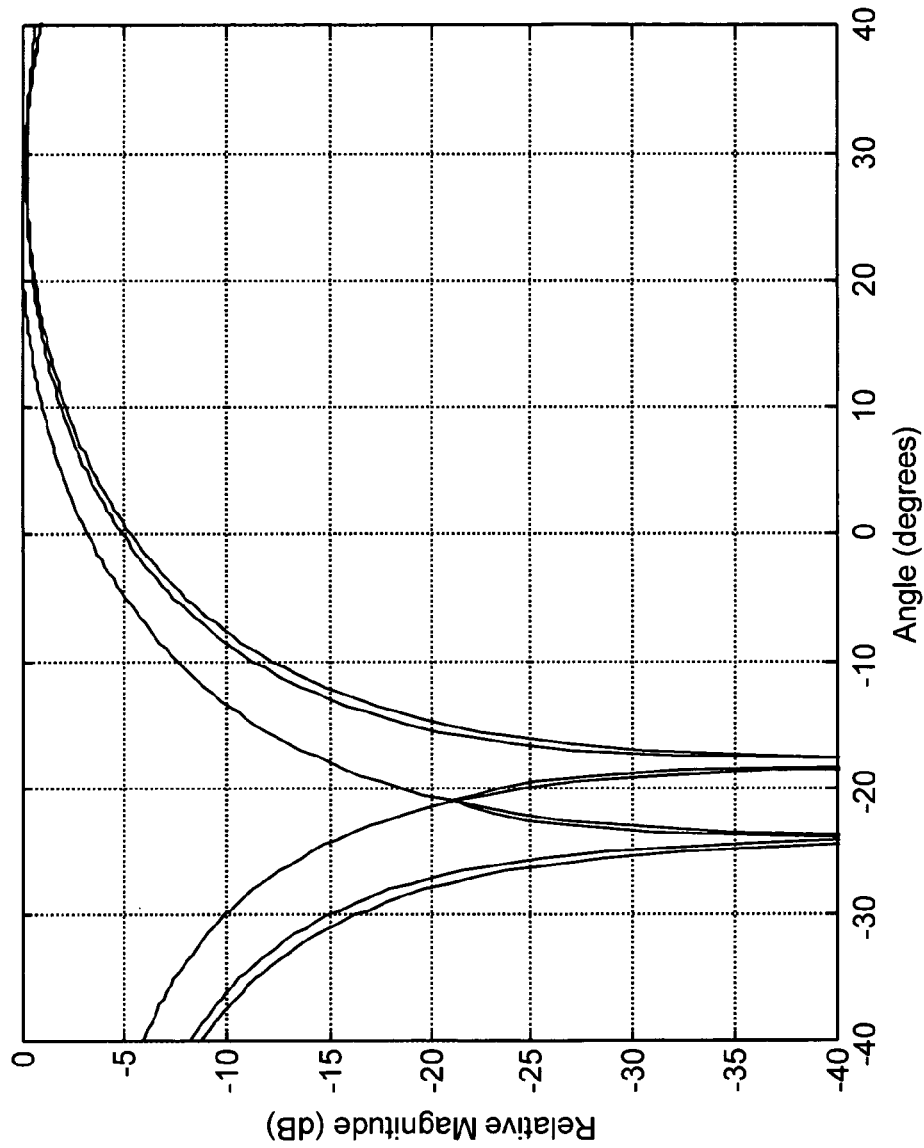
FIG. 7 depicts the minimal affects that a substantially widened null positioned at one of three distinct positions in an antenna radiation pattern has upon the main beam.

Referring to FIG. 6 and FIG. 7 shows that the null region in the antenna pattern can increase in width (i.e., angular coverage) so as to better focus the null in the direction of the ambiguous radar returns and enhancing the rejection of these undesired returns.

Processor 160 (see FIG. 3) implements a software program that integrates a large number of radar return pulses from a desired direction to form a SAR image. Integration is required because even for targets in the desired direction there can exist wide amplitude variations in the returns. Moreover, radar returns from targets in the undesired direction, while attenuated by the effect of the positioning of the null, may still have greater amplitude than returns for the desired direction. These returns from the undesired direction can produce artifacts in the SAR image formed from the desired antenna direction. One skilled in the art would appreciate that processor 160 would normally function in cooperation with a receiver and that such a receiver would detect certain signal characteristics (i.e., modulation, signal strength, etc.) which processor 160 in combination with a software program would in turn exploit so as to render an improved SAR image. In that regard, processor 160 will (1.) broaden the null in this undesired direction to reduce the amplitude of undesired radar returns causing the artifacts; (2.) detect the modulation induced on returns from the undesired direction and identify artifacts in the SAR image; and (3.) subtract these artifacts from the fully formed SAR image.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In an antenna system having at least two elements, an apparatus for minimizing antenna backside signal response and ambiguity, comprising:

a means for causing a phase difference having a plurality of outputs;

a signal path connecting each of said at least two elements to a corresponding output of said means for causing a phase difference;

a means for causing a variable time delay disposed in at least one said signal path;

a processor; and a software program;

said software program comprising computer implementable instructions capable of being executed in said processor wherein, when executed, causes said processor to control said means for causing a variable time delay so as to iteratively cause at least one null to be positioned in the antenna pattern of said antenna in the direction of an undesired received signal;

cause at least one null to be positioned in the antenna pattern of said antenna in the direction of a desired received signal;

dither the position of said nulls according to a predetermined pattern;

detect, at fixed weighting, amplitude modulations on signals received in the spatial direction of said undesired received signal and said desired received signal;

tag strongly amplitude modulated signals as ambiguous artifacts;

tag non amplitude modulated signals and weakly amplitude modulated signals as desirous;

subtract said ambiguous artifacts from said desirous signals; and integrate the results of said subtraction for each iteration.

2. The apparatus of claim 1, wherein said means for causing a phase difference comprises at least one pair of outputs having a 180 degree relative phase difference.

3. The apparatus of claim 1, wherein said means for causing a variable time delay further comprises an individually selectable plurality of radio frequency transmission media of various electrical length, each of said plurality having a first end and a second end.

4. The apparatus of claim 3, wherein said means for causing a variable time delay further comprises a first switch placed at said first end of said plurality of radio frequency transmission media and a second switch placed at said second end of said plurality of radio frequency transmission media so as to cause said signal path to route through a selected said radio frequency transmission media.

5. The apparatus of claim 4, wherein said processor cooperates with a means for detecting signal amplitude in said at least one signal path.

6. A method for minimizing antenna backside signal response and ambiguity, comprising the steps of:

introducing a relative phase difference between signal paths each supplying signals to at least two antenna elements of an antenna;

causing a variable time delay in at least one said signal path; and iteratively positioning at least one null in the antenna pattern of said antenna in the direction of an undesired received signal;

positioning at least one null in the antenna pattern of said antenna in the direction of a desired received signal;

dithering the position of said nulls according to a predetermined pattern;

detecting, at fixed weighting, amplitude modulations on signals received in the spatial direction of said undesired received signal and said desired received signal;

tagging strongly amplitude modulated signals as ambiguous artifacts;

tagging non-amplitude modulated signals and weakly amplitude modulated signals as desirous;

subtracting said ambiguous artifacts from said desirous signals; and integrating the results of said subtraction for each iteration.

7. The method of claim 6, wherein said step of introducing a relative phase difference further comprises introducing a 180 degree phase difference.

8. The method of claim 7, wherein said step of causing a variable time delay further comprises the step of selecting a time delay from a plurality of discrete selectable time delay elements.

9. The method of claim 8, wherein said discrete selectable time delay elements are radio frequency transmission media of various electrical length, each having a first end and a second end.

10. The method of claim 9, wherein said step of selecting further comprises electrically switching said first end and said second end of any of said frequency transmission media into said at least one signal path.

11. The antenna system of claim 1, wherein said weakly amplitude modulated signals further comprise amplitude modulations of substantially less than 1 decibel; and wherein said strongly amplitude modulated signals further comprise amplitude modulations of substantially greater than 1 decibel.

12. The method of claim 6, wherein said weakly amplitude modulated signals further comprise amplitude modulations of substantially less than 1 decibel; and wherein said strongly amplitude modulated signals further comprise amplitude modulations of substantially greater than 1 decibel.

* * * * *